(12) United States Patent
Takahashi et al.

(10) Patent No.: US 9,674,712 B2
(45) Date of Patent: Jun. 6, 2017

(54) RADIO COMMUNICATION METHOD AND RADIO COMMUNICATION APPARATUS

(71) Applicant: Panasonic Corporation, Osaka (JP)

(72) Inventors: Hiroshi Takahashi, Kanagawa (JP); Masataka Irie, Kanagawa (JP); Naoto Oka, Kanagawa (JP); Yoshio Urabe, Nara (JP); Takenori Sakamoto, Kanagawa (JP); Kazuhiro Ando, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/620,838

(22) Filed: Feb. 12, 2015

(65) Prior Publication Data

US 2015/0245225 A1 Aug. 27, 2015

(30) Foreign Application Priority Data

Feb. 26, 2014 (JP) .................................. 2014-035904

(51) Int. Cl.
*H04B 17/00* (2015.01)
*H04W 16/28* (2009.01)
*H04B 7/06* (2006.01)
*H04B 7/08* (2006.01)
*H04B 17/12* (2015.01)

(52) U.S. Cl.
CPC .......... *H04W 16/28* (2013.01); *H04B 7/0695* (2013.01); *H04B 7/088* (2013.01); *H04B 17/12* (2015.01)

(58) Field of Classification Search
CPC ...... H04W 24/02; H04W 16/28; H04B 17/12; H04B 7/0695; H04B 7/088
See application file for complete search history.

(56) References Cited

U.S. PATENT DOCUMENTS

| | | | | |
|---|---|---|---|---|
| 5,691,729 | A * | 11/1997 | Gutman | H01Q 3/26 342/151 |
| 2002/0034943 | A1* | 3/2002 | Pallonen | H01Q 3/24 455/424 |
| 2007/0104171 | A1* | 5/2007 | Kasami | H04W 72/1257 370/339 |
| 2007/0140177 | A1* | 6/2007 | Li | H01Q 1/246 370/335 |
| 2007/0232359 | A1* | 10/2007 | Pinheiro | H04B 7/0695 455/562.1 |

(Continued)

FOREIGN PATENT DOCUMENTS

| | | |
|---|---|---|
| JP | 2013-515433 | 5/2013 |
| WO | 2008/146494 | 12/2008 |
| WO | 2011/084225 | 7/2011 |

*Primary Examiner* — Md Talukder
(74) *Attorney, Agent, or Firm* — Seed Intellectual Property Law Group LLP

(57) ABSTRACT

A radio communication method includes the steps of: storing a beam having a good characteristic and a beam having a bad characteristic on the basis of a result of beamforming setting; reserving a calibration period; changing a beam to the beam having the bad characteristic in the reserved calibration period; performing calibration in the reserved calibration period; and changing the beam having the bad characteristic to the beam having the good characteristic after the reserved calibration period has elapsed.

22 Claims, 11 Drawing Sheets

(56) References Cited

U.S. PATENT DOCUMENTS

| | | | |
|---|---|---|---|
| 2009/0017814 A1* | 1/2009 | Horiuchi | H04B 7/15557 455/422.1 |
| 2010/0103044 A1* | 4/2010 | Hoshino | H04B 7/0617 342/372 |
| 2010/0150013 A1 | 6/2010 | Hara et al. | |
| 2010/0189189 A1* | 7/2010 | Hoshino et al. | H04B 7/0408 375/267 |
| 2012/0108258 A1* | 5/2012 | Li | G01S 5/30 455/456.1 |
| 2012/0309321 A1* | 12/2012 | Agarwal | H04W 72/1252 455/67.11 |
| 2013/0039345 A1* | 2/2013 | Kim | H04W 72/046 370/332 |
| 2014/0004880 A1* | 1/2014 | Shen | G01S 19/23 455/456.1 |
| 2014/0269414 A1* | 9/2014 | Hyde | H04L 41/0803 370/254 |
| 2015/0245225 A1* | 8/2015 | Takahashi | H04W 16/28 455/67.11 |
| 2015/0245302 A1* | 8/2015 | Lim | H04W 52/34 455/522 |

* cited by examiner

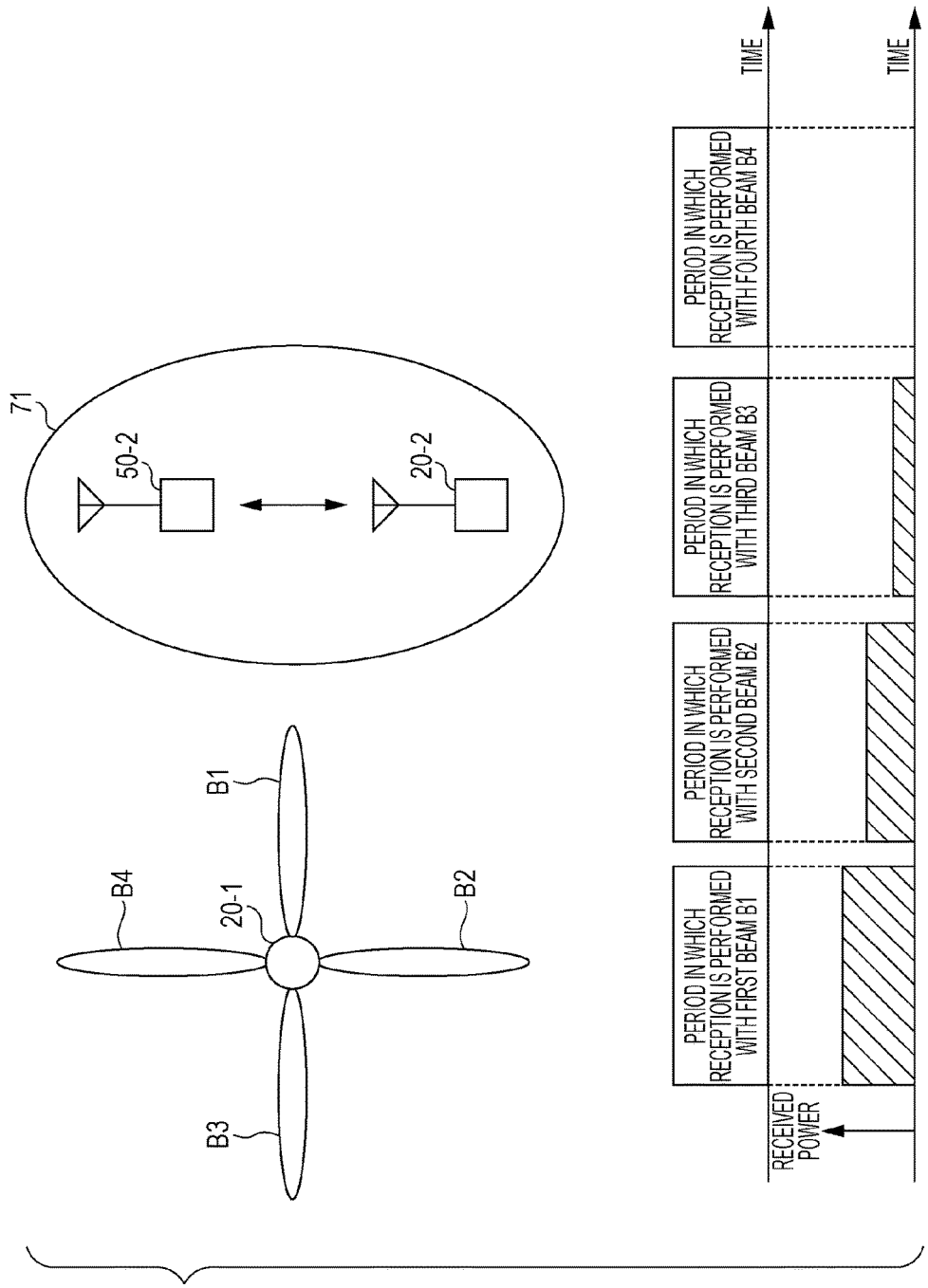

RADIO COMMUNICATION METHOD AND RADIO COMMUNICATION APPARATUS

BACKGROUND

1. Technical Field

The present disclosure relates to a radio communication method and apparatus for performing calibration during communication for the sake of improving a transmission characteristic or a reception characteristic.

2. Description of the Related Art

Radio communication apparatuses perform calibration so as to improve the degradation of a transmission characteristic or a reception characteristic caused by, for example, a temperature rise. In calibration in the related art, a signal is transmitted from one of two antennas of a terminal and is received by the other antenna. WO 2008/146494 discloses a calibration method performed by a radio communication apparatus.

SUMMARY

However, in calibration methods in the related art, a terminal may receive a signal other than a calibration signal transmitted therefrom during calibration, and a communication partner may receive a calibration signal and malfunction.

One non-limiting and exemplary embodiment provides a radio communication method of preventing a terminal from receiving a signal other than a calibration signal transmitted therefrom during calibration and preventing a communication partner from receiving a calibration signal transmitted from a terminal during calibration.

In one general aspect, the techniques disclosed here feature a radio communication method including the steps of: storing a beam having a good characteristic and a beam having a bad characteristic on the basis of a result of beamforming setting; reserving a calibration period; changing a beam to the beam having the bad characteristic in the reserved calibration period; performing calibration in the reserved calibration period; and changing the beam having the bad characteristic to the beam having the good characteristic after the reserved calibration period has elapsed.

According to the present disclosure, a terminal is prevented from receiving a signal from another terminal during calibration and another terminal is prevented from receiving a calibration signal from the terminal during calibration. This enhances the accuracy of calibration.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 11 is a diagram describing the operation of a terminal including a radio communication apparatus according to the third embodiment.

DETAILED DESCRIPTION

Embodiments of the present disclosure will be described below with reference to the accompanying drawings.

Underlying Knowledge Forming Basis of an Embodiment of the Present Disclosure In recent years, a plurality of radio communication standards for millimeter wave radio communication in which the 60 GHz band is used have been provided or considered.

Examples of wireless LAN (Local Area Network)/wireless PAN (Personal Area Network) standards requiring no license include WiGig (Wireless Gigabit), IEEE802.15.3c, Wireless HD (High Definition), and ECMA-387. The IEEE802.11ad standard has already been provided.

As the miniaturization of circuits continues in radio communication apparatuses, the degradation of a transmission characteristic or a reception characteristic occurs because of heat from the circuits. In order to improve a transmission characteristic or a reception characteristic, calibration is performed. A calibration method performed in a radio communication apparatus is disclosed in, for example, WO 2008/146494.

In a calibration method disclosed in WO 2008/146494, a pilot signal is transmitted from a first antenna and is received by a second antenna, and a first channel estimation value is calculated. A pilot signal is transmitted from the second antenna and is received by the first antenna, and a second channel estimation value is calculated. With the first and second channel estimation values, a correction coefficient used for the adjustment of a signal transmitted between the first and second antennas is calculated.

However, in a case where the technique disclosed in WO 2008/146494 is used, a terminal may receive a signal from another terminal in addition to the signal transmitted therefrom during calibration. Furthermore, it is difficult to allocate a period dedicated to the reception of the signal transmitted therefrom. Still furthermore, the signal transmitted from the terminal may be received by another terminal, and the other terminal that has received the signal perform unnecessary reception processing.

A radio communication method and apparatus for preventing a terminal from receiving a signal other than a calibration signal transmitted therefrom during calibration and preventing a communication partner from receiving a calibration signal transmitted during calibration will be described below.

Descriptions will be made under the assumption that a radio communication method and apparatus according to an embodiment of the present disclosure is used in a terminal that is compliant with a millimeter wave communication standard known as WiGig. A terminal may be compliant with another millimeter wave communication standard known as IEEE802.15.3c or another directional radio communication standard.

Furthermore, an embodiment of the present disclosure will be described using a NetWork (NW) configuration in which a base station (PCP) manages a plurality of terminals (STAs) with a single channel.

First Embodiment

Figure 1:
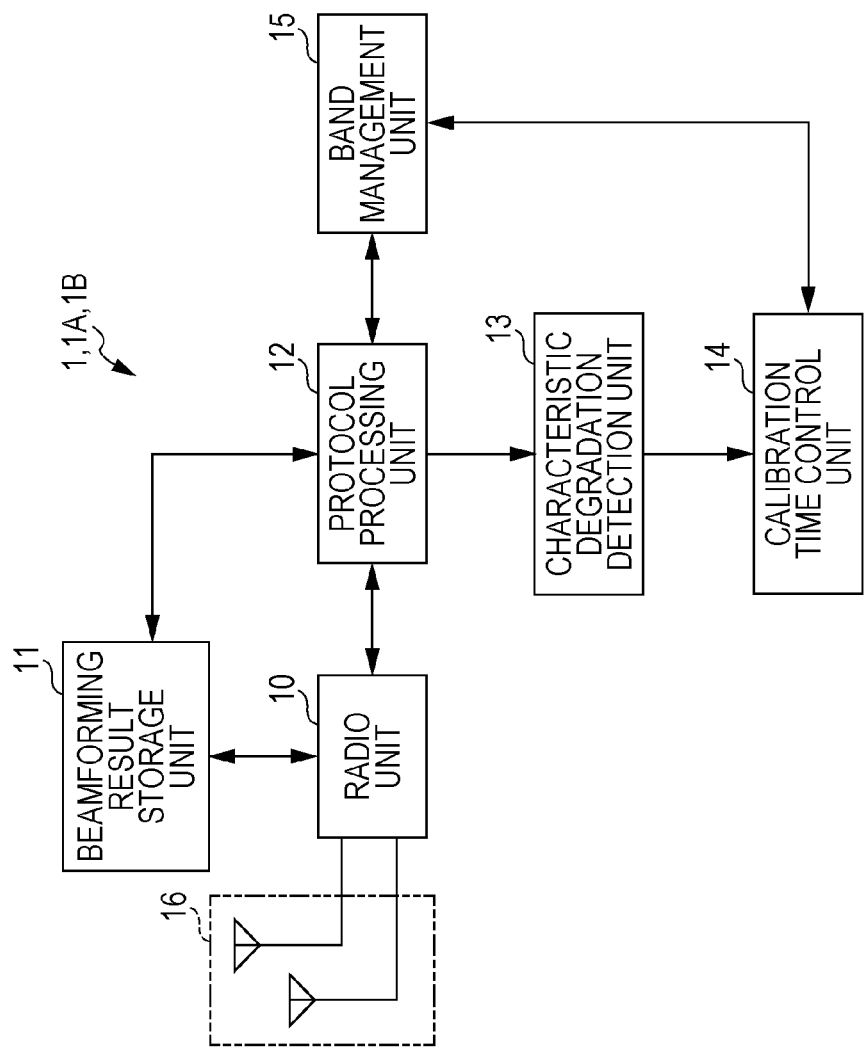
FIG. 1 is a diagram illustrating, in outline, the configuration of a radio communication apparatus according to a first embodiment.

FIG. 1 is a diagram illustrating, in outline, the configuration of a radio communication apparatus according to the first embodiment. Referring to the drawing, a radio communication apparatus 1 according to the first embodiment operates in a WiGig-compliant terminal as described previously, and includes a radio unit 10, a beamforming result storage unit 11, a protocol processing unit 12, a characteristic degradation detection unit 13, a calibration time control unit 14, a period management unit (period reservation unit) 15, and antennas 16. The period management unit 15 corresponds to a period reservation unit. The radio unit 10 corresponds to a first beam change unit, a second beam change unit, and a calibration unit.

The antennas 16 include two antennas, a transmission antenna and a receiving antenna. The radio unit 10 performs radio reception processing (for example, down-conversion, analog-to-digital conversion, and demodulation) upon a radio reception signal received via the receiving antenna 16 and outputs the radio reception signal to the protocol processing unit 12. Furthermore, the radio unit 10 performs radio transmission processing (for example, up-conversion, digital-to-analog conversion, and modulation) upon a digital signal input from the protocol processing unit 12 and transmits the processed signal via the transmission antenna 16. Still furthermore, the radio unit 10 forms beams for beamforming and switches among the formed beams. Still furthermore, the radio unit 10 outputs a result of beamforming setting processing and information on each beam (for example, received power, Received Signal Strength Indication (RSSI), and an error rate) to the beamforming result storage unit 11.

The beamforming result storage unit 11 stores the information on each beam transmitted from the radio unit 10. The protocol processing unit 12 performs, for example, processing for making a connection to the terminal of a communication partner, authentication processing, period reservation, period release processing, or beamforming control processing. Furthermore, the protocol processing unit 12 performs, for example, processing for generating a packet to be transmitted and processing for analyzing a received packet. Still furthermore, the protocol processing unit 12 stores statistical information including, for example, the number of transmitted packets, the number of retransmitted packets, the number of received packets, and the number of Cyclic Redundancy Check (CRC) errors included in received packets. The statistical information may be managed for each connected terminal or each type of packet. Still furthermore, the protocol processing unit 12 provides a calibration instruction for the radio unit 10 or performs beam control during calibration.

The characteristic degradation detection unit 13 detects the degradation of a transmission characteristic or a reception characteristic of the radio communication apparatus 1 on the basis of statistical information managed by the protocol processing unit 12. When the characteristic degradation detection unit 13 detects the degradation of a transmission characteristic or a reception characteristic, it notifies the calibration time control unit 14 of the fact. Upon receiving information from the characteristic degradation detection unit 13 (On the basis of information received from the characteristic degradation detection unit 13), the calibration time control unit 14 outputs a period reservation request to the period management unit 15 so as to reserve a period used for calibration. The calibration time control unit 14 may output information about a time taken to perform the last calibration in addition to the period reservation request. Upon receiving the period reservation request from the calibration time control unit 14, the period management unit 15 outputs it to the protocol processing unit 12.

Figure 2:
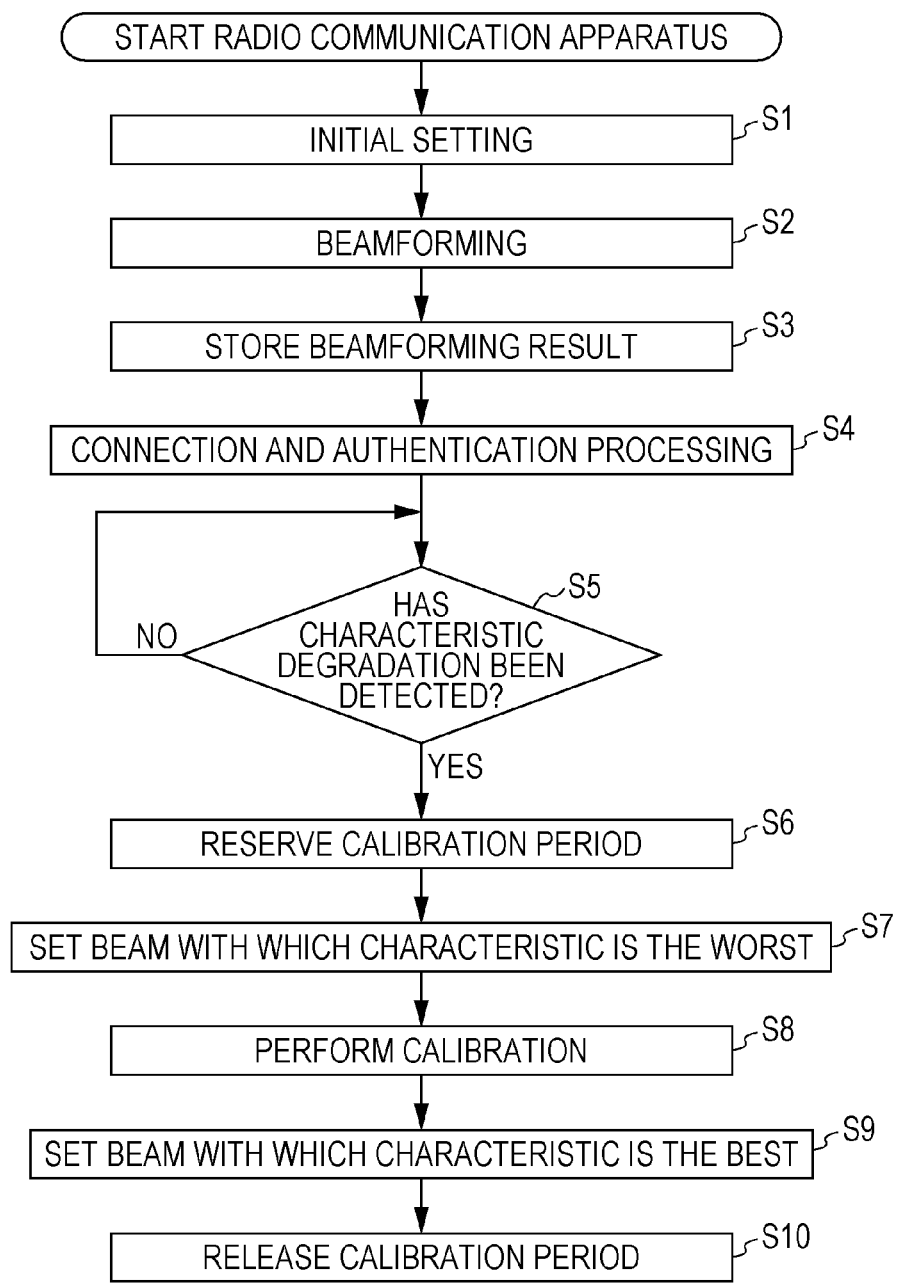
FIG. 2 is a flowchart describing the operation of a radio communication apparatus according to the first embodiment.

FIG. 2 is a flowchart describing the operation of the radio communication apparatus 1 according to the first embodiment. The radio communication apparatus 1 performs the following process from steps S1 to S10:
step S1: initial setting (the radio unit 10);
step S2: beamforming setting processing (the radio unit 10);
step S3: beamforming result storage processing (the beamforming result storage unit 11);
step S4: connection and authentication processing (the protocol processing unit 12);
step S5: characteristic degradation detection processing (the characteristic degradation detection unit 13);
step S6: calibration period reservation processing (the period management unit 15);
step S7: processing for changing antenna directivity by employing a beam with which a characteristic is the worst when a calibration period is set (the radio unit 10);
step S8: calibration processing (the radio unit 10);
step S9: processing for employing a beam with which a characteristic is the best after calibration has been completed (the radio unit 10); and step S10: calibration period release processing (the radio unit 10).

In step S1 in which initial setting is performed, the radio communication apparatus 1 sets various parameters. For example, the setting of a frequency channel used by the radio communication apparatus 1 or the setting of transmission power is performed. In this step, calibration may be performed.

Figure 3:
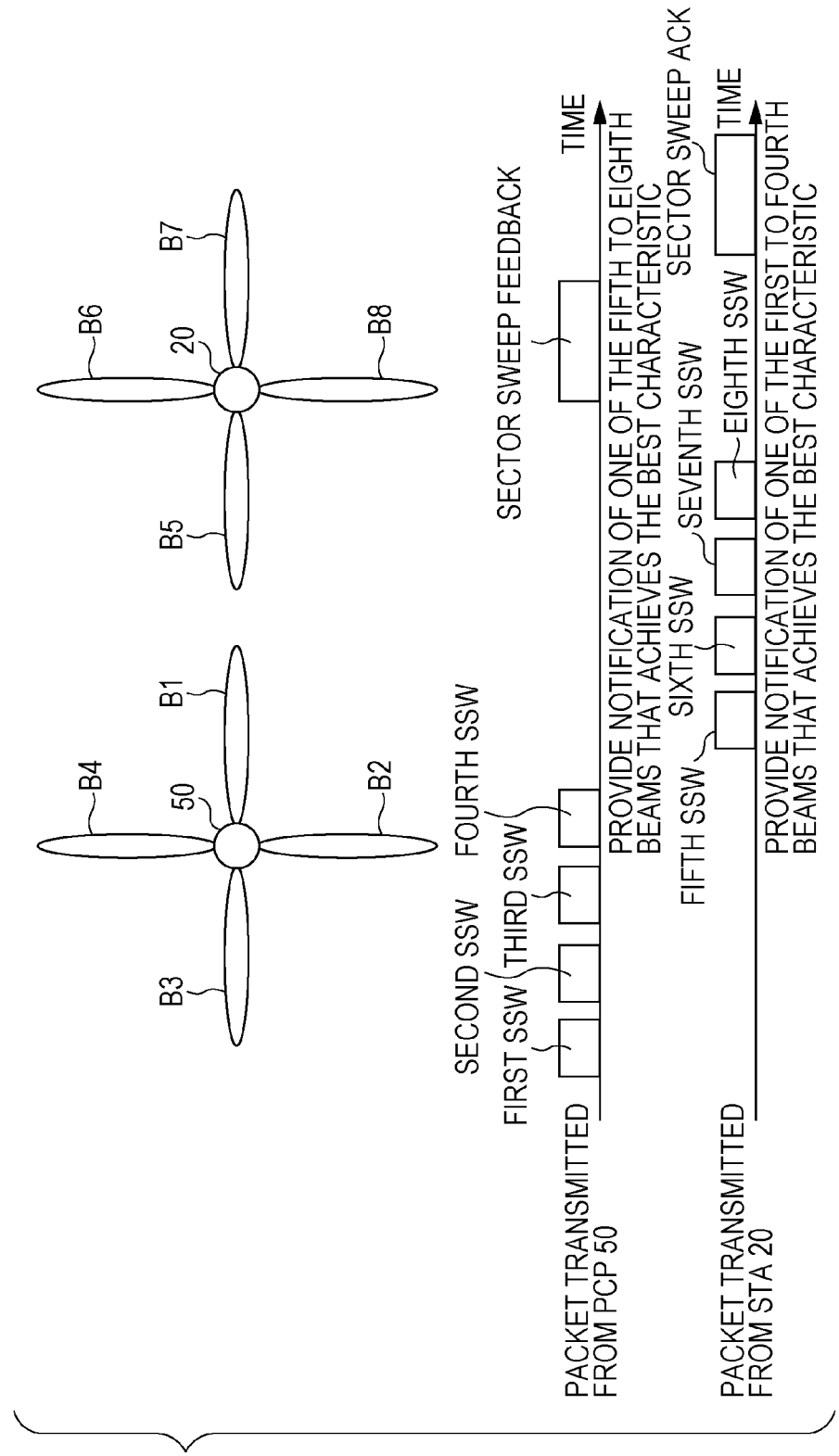
FIG. 3 is a diagram illustrating a beamforming setting process performed in a network in which a terminal including a radio communication apparatus according to the first embodiment and a base station are present.

In step S2 in which beamforming setting processing is performed, the radio communication apparatus 1 determines a beam used for communication with a communication partner. A basic protocol is compliant with a standard. FIG. 3 is a diagram illustrating a beamforming setting process performed in a network in which a terminal (a station (STA)) 20 including the radio communication apparatus 1 according to the first embodiment and a base station (a Personal basic service Control Point (PCP)) 50 are present. Each of the PCP 50 and the STA 20 has four beams (sectors).

The PCP 50 sequentially transmits the first Sector Sweep (SSW), the second SSW, the third SSW, and the fourth SSW using the first beam B1, the second beam B2, the third beam B3, and the fourth beam B4, respectively. The STA 20 receives the first to fourth SSWs from the PCP 50 via a nondirectional antenna and measures a reception characteristic (for example, received power). Upon receiving the fourth SSW from the PCP 50, the STA 20 transmits the fifth SSW, the sixth SSW, the seventh SSW, and the eighth SSW using the fifth beam B5, the sixth beam B6, the seventh beam B7, and the eighth beam SSW, respectively. The PCP 50 receives these SSWs from the STA 20 via a nondirectional antenna and measures a reception characteristic.

After receiving the eighth SSW, the PCP 50 selects one of the fifth to eighth SSWs having the best reception characteristic and transmits a Sector Sweep Feedback including the ID of the selected SSW. Upon receiving the Sector Sweep Feedback from the PCP 50, the STA 20 selects one of the received first to fourth SSWs having the best reception characteristic and transmits a Sector Sweep ACK including the ID of the selected SSW. Although the ID of a sector having the best reception characteristic is transmitted, the ID of a sector having a reception characteristic greater than or equal to a predetermined reception characteristic may be transmitted.

Referring back to FIG. 2, in step S3 in which a result of beamforming setting is stored, the radio communication apparatus 1 stores a beam that is most suitable for data communication (hereinafter referred to as "the best beam") and a beam unsuitable for data communication (hereinafter referred to as "the worst beam") on the basis of a result of a beamforming protocol (beamforming setting). A method of determining the worst beam will be described with reference to FIG. 3.

The best beam is determined as described previously. The determination of the worst beam will be described below. The easiest way to determine the worst beam is to set a beam other than the best beam as the worst beam. For example, when the first beam B1 is the best beam in the PCP 50 illustrated in FIG. 3, the third beam B3 facing the first beam B1 is set as the worst beam.

The radio communication apparatus 1 may measure the worst beam in addition to the best beam while processing is performed in accordance with a beamforming protocol and notify a communication partner of results of the measurement. For example, the notification is performed with a frame format of Sector Sweep Feedback illustrated in FIG. 4 and a frame format of Sector Sweep ACK illustrated in FIG. 5. Worst Sector Selects 301 and 401 are set in Reserved fields in the Sector Sweep Feedback and the Sector Sweep ACK, respectively. The IDs of sectors having the worst reception characteristic are included in the Worst Sector Selects 301 and 401 for the sake of the notification.

Figure 4:
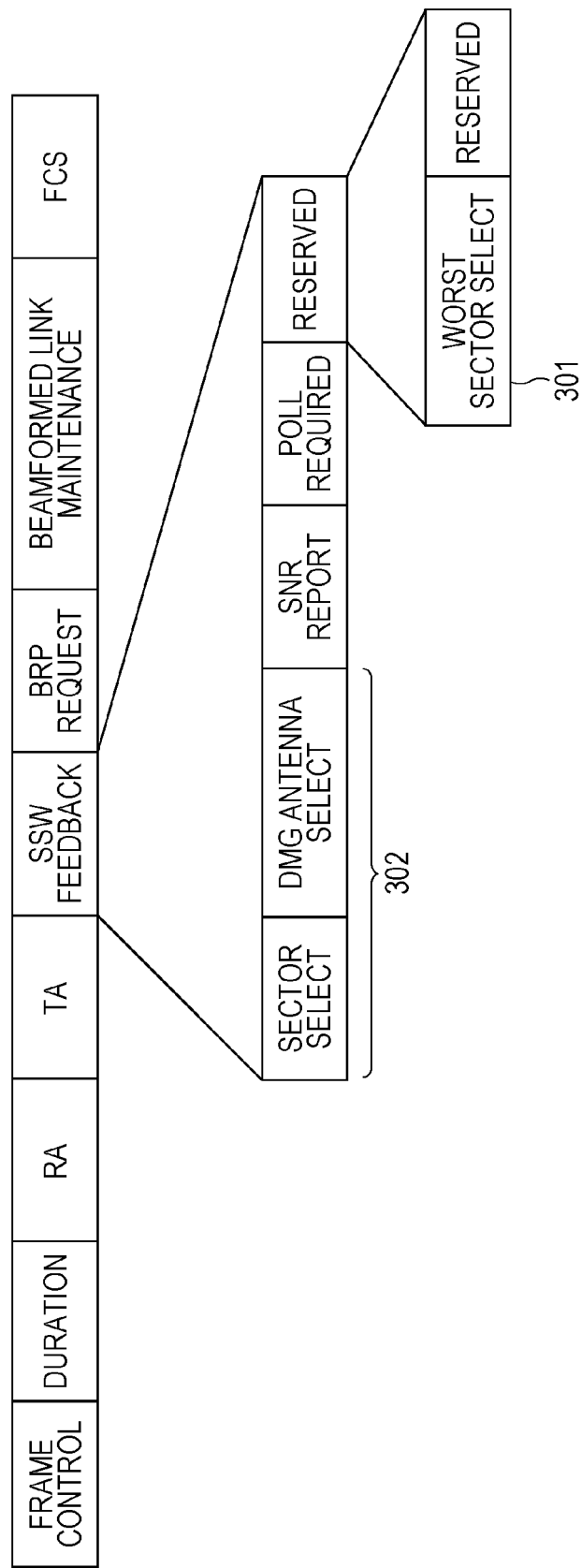
FIG. 4 is a diagram illustrating the format of a Sector Sweep Feedback frame.
Figure 5:
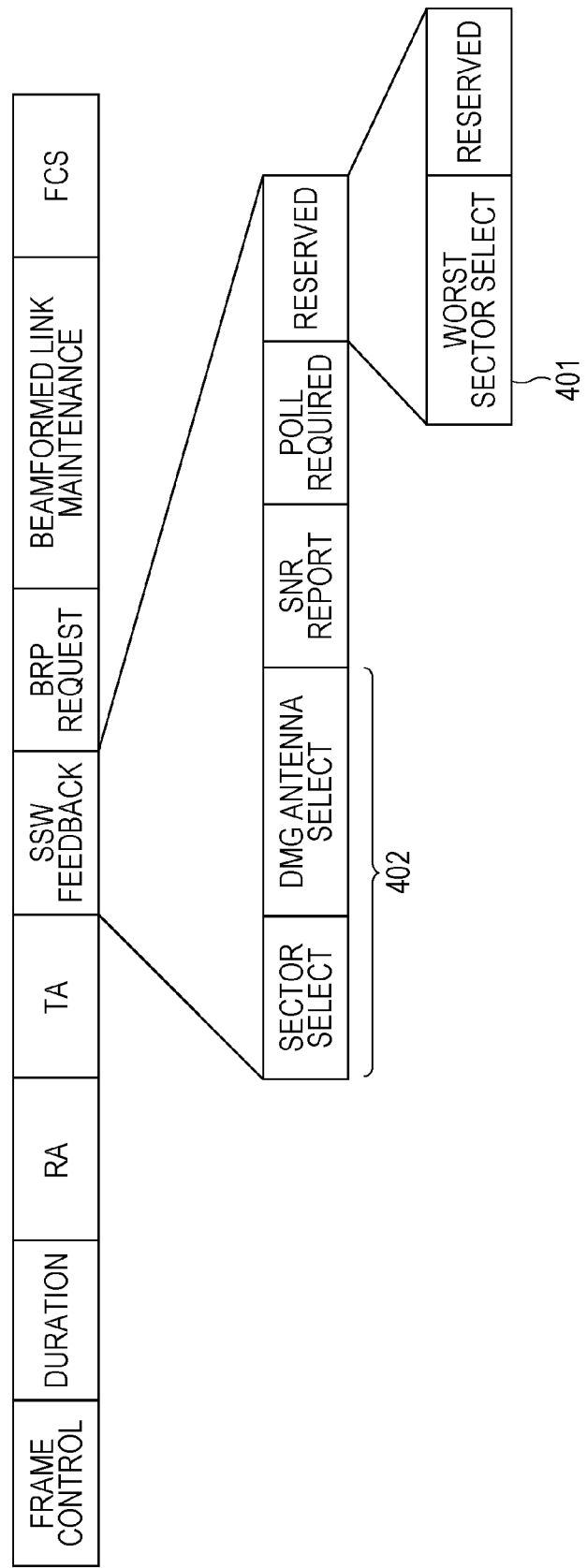
FIG. 5 is a diagram illustrating the format of a Sector Sweep acknowledgement (ACK) frame.

In Sector Select·DMG Antenna Selects 302 and 402 illustrated in FIGS. 4 and 5, pieces of information about the best beams are included. The radio communication apparatus 1 may notify a communication partner of the characteristics of all beams (sectors). For example, information about each sector may be included in an Information Element (IE) and be added to a frame. In this case, the radio communication apparatus 1 can select one of sectors having characteristics less than or equal to a predetermined characteristic as a calibration beam on the basis of the information about each sector.

Referring back to FIG. 2, after beamforming setting has been performed, connection and authentication processing is performed on a communication partner terminal in step S4.

After the connection and authentication processing has been performed, a characteristic degradation is detected in step S5. The radio communication apparatus 1 determines that a characteristic has been degraded when a retransmission rate in a predetermined period exceeds a predetermined value. The retransmission rate is calculated as follows: the number of retransmission times/(the number of initial transmission times+the number of retransmission times). The radio communication apparatus 1 may determine that a characteristic has been degraded using the combination of the retransmission rate and a throughput degradation rate calculated in the same predetermined period as the retransmission rate. Even though the retransmission rate is degraded, the radio communication apparatus 1 is not affected by the degradation from the viewpoint of throughput. As a result, the radio communication apparatus 1 can reduce the number of calibration times.

The radio communication apparatus 1 may determine that a characteristic has been degraded when the number of CRC errors in a predetermined period exceeds a predetermined value. The radio communication apparatus 1 can use the number of CRC errors to determine whether a reception characteristic has been degraded. The radio communication apparatus 1 may determine that a characteristic has been degraded when a throughput degradation rate in a predetermined period exceeds a predetermined value.

When the radio communication apparatus 1 is provided with a temperature sensor, the radio communication apparatus 1 may use information obtained from the temperature sensor. For example, when the temperature increases from a terminal startup temperature by predetermined degrees or more, it may be determined that a characteristic has been degraded. Alternatively, when the temperature reaches a terminal temperature limit, it may be determined that a characteristic has been degraded regardless of the amount of temperature rise.

The radio communication apparatus 1 may cause a communication partner to measure received power and receive a result of the measurement from the communication partner. When the difference between the notified received power and a transmission power set value is larger than or equal to a predetermined value, the radio communication apparatus 1 may determine that a characteristic has been degraded. When the number of detection times of a characteristic degradation is larger than or equal to a predetermined value, the radio communication apparatus 1 may determine that a characteristic degradation has been periodically detected.

After the detection of a characteristic degradation has been performed, the process proceeds to step S6. In step S6, in response to the detection of a characteristic degradation, the radio communication apparatus 1 reserves a period in which calibration is performed during communication. More specifically, the radio communication apparatus 1 reserves a Service Period (SP) for data communication and uses the reserved period as a calibration period. When the SP has already been set for data communication, the period reservation procedure can be omitted. Accordingly, the radio communication apparatus 1 may use the SP for calibration. When there is an occupiable period reservation method other than the above-described method of using an SP as a calibration period, the method can be employed.

When a plurality of channels can be used at the same time, the radio communication apparatus 1 may reserve a calibration period not only for a channel in current use but also for the other channels. When a period is reserved for a plurality of channels, the radio communication apparatus 1 may set a dedicated flag in a control packet and transmit the packet. By reserving a plurality of channels at the same time, it is possible to eliminate the influence of interference from an adjacent channel and set a no-signal period. This leads to the improvement of accuracy of calibration.

When it is difficult to reserve a calibration period, a terminal having no network control right may be changed from STA to PCP for the sake of the reservation of a period.

After a calibration period has been reserved, the process proceeds to step S7 in which antenna directivity is changed by employing a beam with which a characteristic is the worst. In step S7, the radio communication apparatus 1 controls antenna directivity by employing the worst beam stored in the beamforming setting result storage step S3. The antenna directivity may be changed by employing a beam having a characteristic less than or equal to a predetermined characteristic instead of the beam with which a characteristic is the worst.

After processing for employing a beam with which a characteristic is the worst has been performed, the process proceeds to step S8 in which calibration is performed. In step S8, the radio communication apparatus 1 performs calibration for transmission or reception.

After the calibration has been performed, the process proceeds to step S9 in which a beam with which a characteristic is the best is employed. In step S9, the radio communication apparatus 1 sets the best beam stored in the beamforming setting result storage step S3. A beam having a characteristic greater than or equal to a predetermined characteristic may be used after the calibration instead of the best beam.

The process proceeds to step S10 in which the calibration period is released. In step S10, the radio communication apparatus 1 releases the reserved calibration period. The radio communication apparatus 1 may store a time taken for calibration and perform the next reservation of a calibration period on the basis of the calibration time. As a result, redundant period reservation can be prevented.

Figure 6:
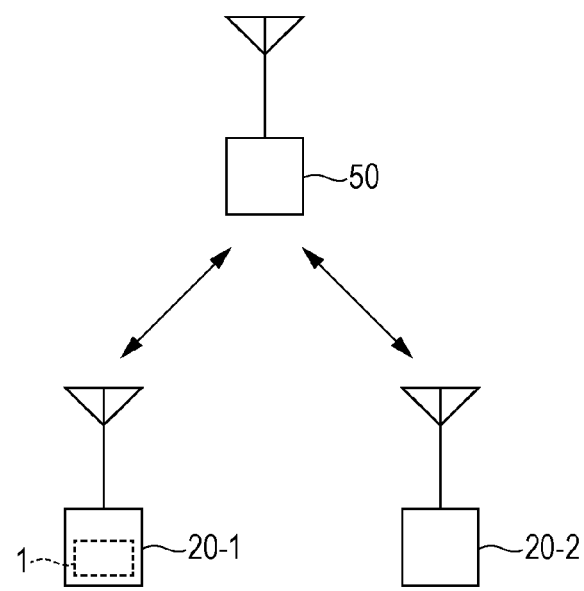
FIG. 6 is a diagram illustrating an exemplary network configuration used for the description of the operation of a terminal including a radio communication apparatus according to the first embodiment.

FIG. 6 is a diagram illustrating an exemplary network configuration used for the description of the operation of a terminal including the radio communication apparatus 1 according to the first embodiment. Referring to the drawing, the PCP 50 is connected to an STA 20-1 and an STA 20-2 and forms a network. The PCP 50 supports a single channel. The STA 20-1 includes the radio communication apparatus 1 according to this embodiment.

Figure 7:
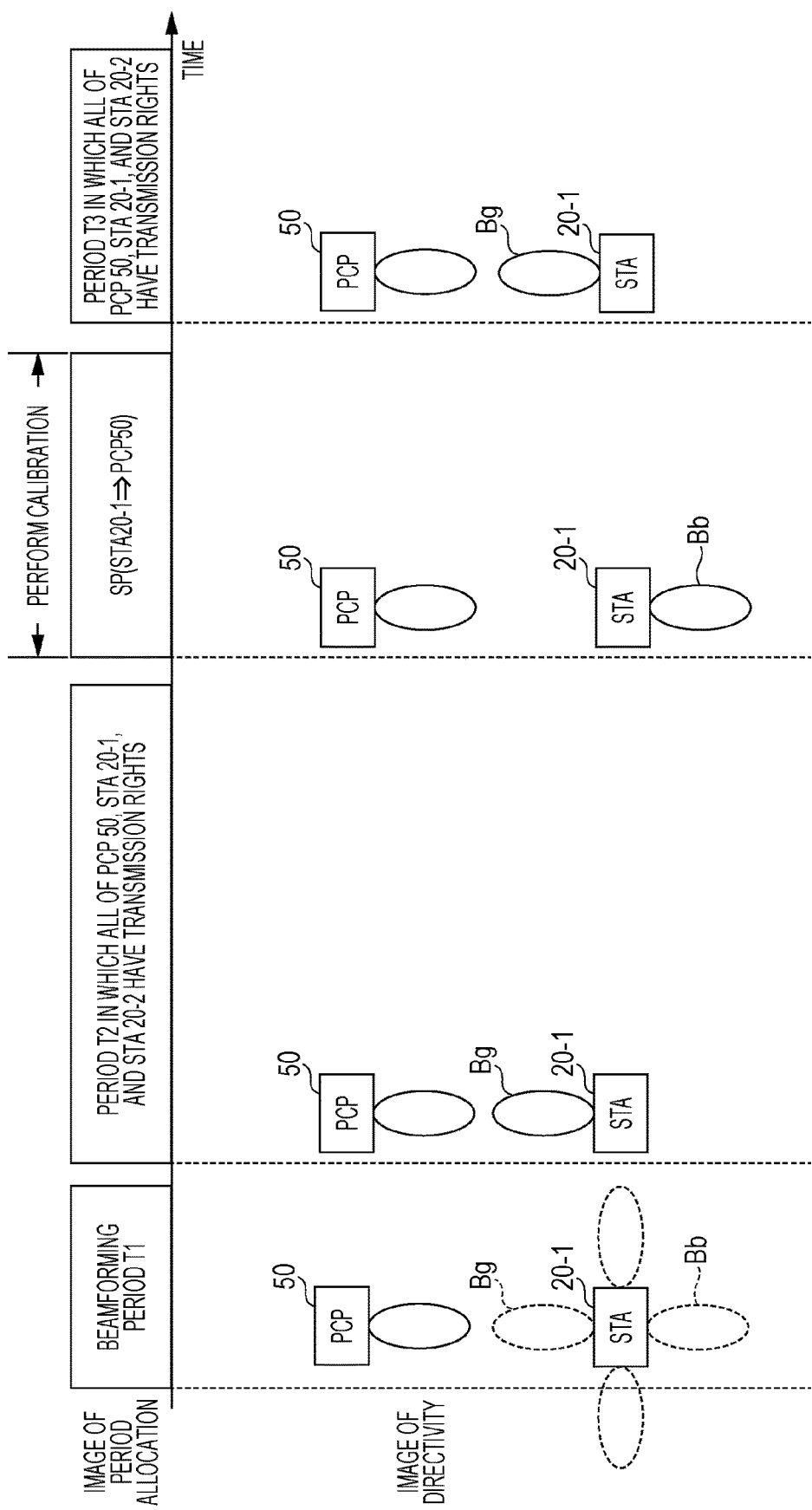
FIG. 7 is a diagram describing a process performed by a terminal including a radio communication apparatus according to the first embodiment before calibration.

FIG. 7 is a diagram describing a process performed by the STA 20-1 before calibration and schematically illustrates the image of period allocation and beam control performed by the STA 20-1. Referring to the drawing, the STA 20-1 performs beamforming setting for the PCP 50 during a beamforming period T1 and determines a best beam Bg (g stands for Good) and a worst beam Bb (b stands for Bad). After the beamforming period T1, the STA 20-1 sets the best beam Bg. The beamforming period T1 is changed to a period T2 in which all of the PCP 50, the STA 20-1, and the STA 20-2 have transmission rights. The illustration of the STA 20-2 is omitted. When the degradation of a transmission characteristic or a reception characteristic is detected in the period T2, the STA 20-1 reserves a calibration period.

The STA 20-1 makes an SP request of the PCP 50 to have a right of transmission to the PCP 50. After a period reservation request has been received, the period is changed to the SP. The STA 20-1 sets the worst beam Bb and performs calibration. In the calibration period, since the PCP 50 and the STA 20-2 have no transmission right, the STA 20-1 can set a no-signal period in which no signal is received. After the calibration, the STA 20-1 changes the beam back to the best beam Bg and releases the calibration period. Subsequently, the period is changed to a period T3.

The radio communication apparatus 1 according to the first embodiment stores a beam with which a good characteristic is obtained and a beam with which a bad characteristic is obtained at the time of beamforming setting, reserves a calibration period when the degradation of a transmission characteristic or a reception characteristic is detected, changes a beam to the beam with which a bad characteristic is obtained, performs calibration in the reserved period using the beam with which a bad characteristic is obtained, and then changes a beam back to the beam with which a good characteristic is obtained after performing the calibration. Accordingly, it is possible to prevent the radio communication apparatus from receiving a signal from another terminal during calibration and prevent another terminal from receiving a signal from the radio communication apparatus during the calibration. This leads to the improvement of accuracy of calibration.

Second Embodiment

Figure 8:
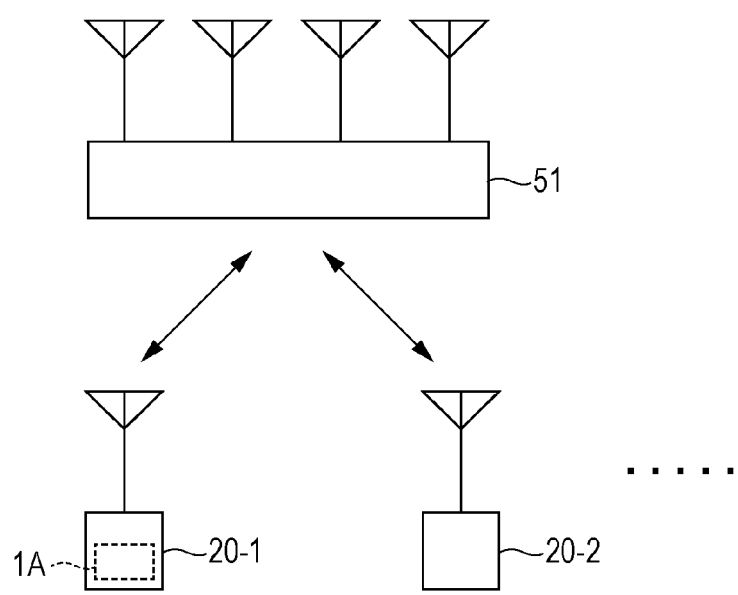
FIG. 8 is a diagram illustrating an exemplary network configuration used for the description of the operation of a terminal including a radio communication apparatus according to a second embodiment.

FIG. 8 is a diagram illustrating an exemplary network configuration used for the description of the operation of a terminal including a radio communication apparatus according to the second embodiment. In this network configuration, a PCP supports a plurality of channels and manages a plurality of STAs. A PCP 51 capable of using a plurality of channels at the same time are connected to the STA 20-1 and the STA 20-2 via different channels. The STA 20-1 includes a radio communication apparatus 1A according to the second embodiment.

The WiGig specification defines four channels, the channels ch1 to ch4. The STA 20-1 uses the channel ch2 to be connected to the PCP 51, and the STA 20-2 uses the channel ch3 to be connected to the PCP 51. A calibration period reservation method performed by the radio communication apparatus 1A included in the STA 20-1 will be described. A method of determining the best beam and the worst beam and a method of detecting the degradation of a characteristic are the same as those according to the first embodiment. The radio communication apparatus 1A according to the second embodiment has the same configuration as that of the radio communication apparatus 1 according to the first embodiment illustrated in FIG. 1.

Figure 9:
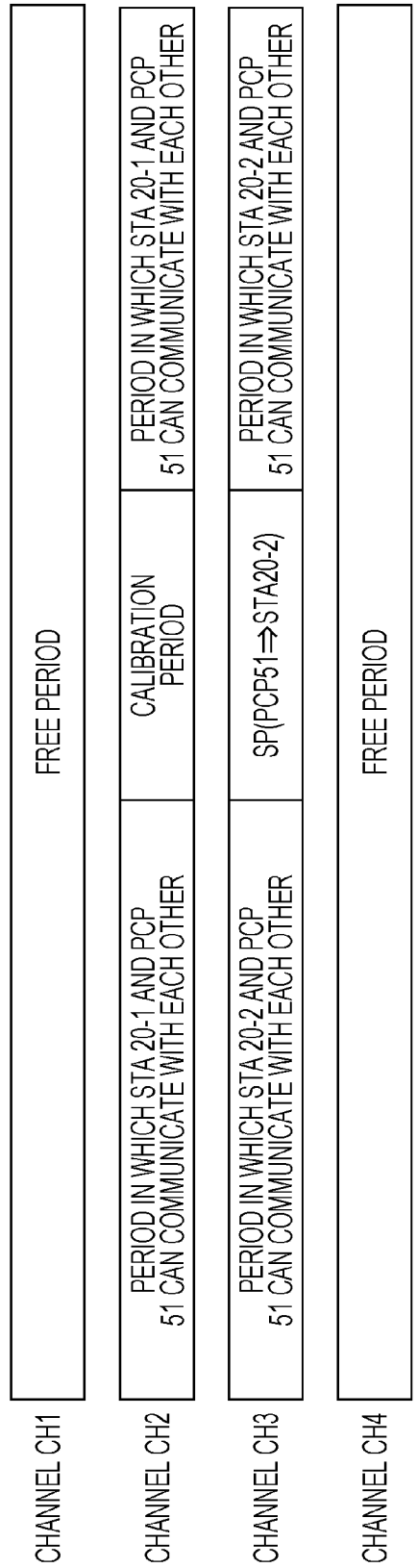
FIG. 9 is a diagram describing a calibration period reservation method performed by a terminal including a radio communication apparatus according to the second embodiment.

FIG. 9 is a diagram describing a calibration period reservation method performed by the STA 20-1. Referring to the drawing, since the STA 20-1 and the STA 20-2 use different channels, it is probable that the STA 20-1 receives no signal from the STA 20-2. Since the STA 20-1 including the radio communication apparatus 1 according to the first embodiment and the STA 20-2 use the same channel, it is difficult to prevent the STA 20-1 from receiving a signal from the STA 20-2.

Since the channels used by the STA 20-1 and the STA 20-1 differ from each other, the STA 20-1 is less affected by a signal from the STA 20-2. However, the interference of an adjacent channel may occur and the STA 20-1 may receive a signal from the STA 20-2. The channels ch1 and ch4 are empty channels that are used by none of the PCP 51, the STA 20-1, and the STA 20-2. The channel ch2 can be used by the PCP 51 and the STA 20-1. The channel ch3 can be used by the PCP 51 and the STA 20-2.

Like the radio communication apparatus 1 according to the first embodiment, the radio communication apparatus 1A included in the STA 20-1 issues a calibration period request to the PCP 51 when detecting a characteristic degradation. Upon receiving the calibration period request from the STA 20-1, the PCP 51 sets the calibration period for the channel ch2. At the moment when the calibration period is set for the channel ch2, the PCP 51 sets an SP for the channel ch3 so as to set the PCP 51 and the STA 20-2 as a transmission source and a transmission destination, respectively.

Therefore the STA 20-2 that uses the channel ch3 is prohibited from performing transmission. Since the PCP 51 is in the middle of calibration with STA 20-1 using the channel ch2, the PCP 51 is prohibited from performing transmission.

In the general setting of an SP, the STA 20 or the PCP 51 sets an SP in response to an SP setting request transmitted from an upper layer (for example, an application or a supplicant). That is, when there is a data transmission request from an upper layer, the setting of an SP is performed.

In this embodiment, however, the setting of an SP used for calibration on the channel ch2 is performed and there is no SP setting request from an upper layer. Accordingly, there is no data transmission request from an upper layer. In the SP, the PCP 51 has a transmission right. However, since the PCP 51 does not autonomously generate data and transmit the generated data, no packet is transmitted from the PCP 51 in the SP.

Therefore, in the period in which a calibration period is set for the channel ch2, the STA 20-1 can perform transmission.

After the calibration, the PCP 51 releases the calibration periods set for the channels ch2 and ch3.

When the STA 20-1 reserves calibration periods for a plurality of channels, the STA 20-1 may set a flag indicating the reservation of a plurality of channels in a control packet used for a period request and transmit the period request to the PCP 51. As a result, the PCP 51 receives the period request asking the reservation of a plurality of channels and can reserve periods for a plurality of channels.

Third Embodiment

Figure 10:
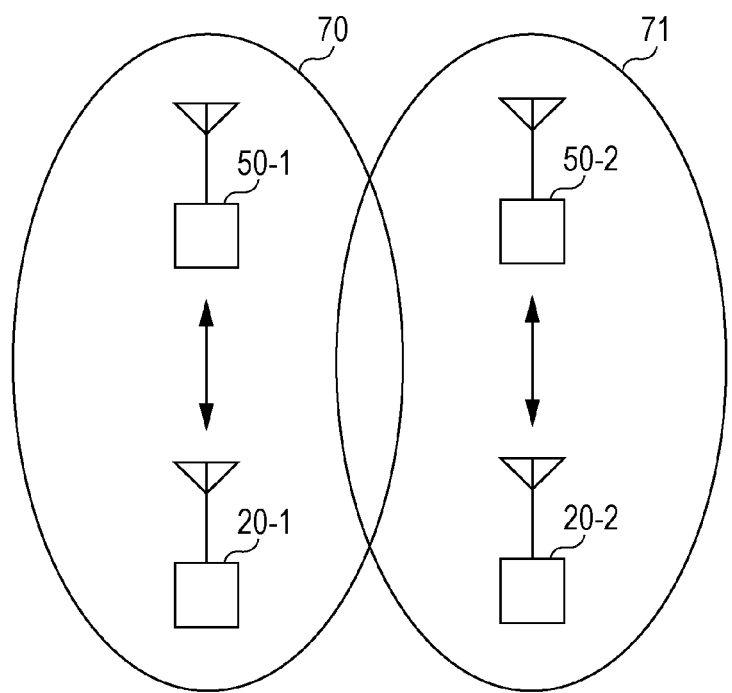
FIG. 10 is a diagram illustrating an exemplary network configuration used for the description of the operation of a radio communication apparatus according to a third embodiment.

FIG. 10 is a diagram illustrating an exemplary network configuration used for the description of the operation of a radio communication apparatus according to the third embodiment. Referring to the drawing, a network 70 including a PCP 50-1 and the STA 20-1 and a network 71 including a PCP 50-2 and the STA 20-2 are adjacent to each other. The networks 70 and 71 may use the same channel or different channels.

In the network configuration illustrated in FIG. 10, the PCPs 50-1 and 50-2 are different base stations. Accordingly, it is difficult to share period allocation between the networks 70 and 71. A radio communication apparatus 1B according to the third embodiment has the same configuration as that of the radio communication apparatus 1 according to the first embodiment illustrated in FIG. 1.

The STA 20-1 includes the radio communication apparatus 1B according to the third embodiment. The radio communication apparatus 1B performs a beam control method different from that performed by the radio communication apparatus 1 according to the first embodiment and the radio communication apparatus 1A according to the second embodiment, and performs, for example, the same characteristic degradation detection method or the same calibration period reservation procedure as that performed by the radio communication apparatuses 1 and 1A. A best beam selection method performed by the STA 20-1 is the same as that performed by the radio communication apparatuses 1 and 1A. However, a worst beam determination method performed by the STA 20-1 is different from that performed by the radio communication apparatuses 1 and 1A. As the worst beam determination method, a method of observing the condition of reception in a state in which a beam is concentrated for a predetermined period is employed. This method will be described below with reference to a drawing.

FIG. 11 is a diagram describing the operation of the STA 20-1 including the radio communication apparatus 1B according to the third embodiment. The STA 20-1 executes a beamforming protocol (beamforming setting) so as to determine the best beam. After executing the beamforming protocol, the STA 20-1 performs reception for a predetermined period using the first beam B1. In the network 70 including the STA 20-1, it is desired that the above-described control processing be performed in a calibration period in which terminals other than the STA 20-1 do not perform transmission. Subsequently, the STA 20-1 similarly performs reception for a predetermined period using the second beam B2, the third beam B3, and the fourth beam B4. When another network is adjacent to the network 70 including the STA 20-1, the STA 20-1 may receive a packet from the other network in periods in which reception is performed with the first beam B1 to the fourth beam B4.

Referring to FIG. 11, power received from the network 71 including the PCP 50-2 and the STA 20-2 is detected using the first beam B1, the second beam B2, and the third beam B3 (the height of diagonally shaded portions represents received power). When the first beam B1, the second beam B2, and the third beam B3 are used, a signal may be received from the network 71 in a calibration period. The STA 20-1 selects the fourth beam B4 as the worst beam (a beam used for calibration). As a result, calibration during which no signal is received from a network other than the network 70 including the STA 20-1 provided with the radio communication apparatus 1B can be achieved.

The first to third embodiments have been described with reference to the drawings. However, the present disclosure is not limited to the above-described examples. It will be apparent to those skilled in the art that various modifications and changes can be made within the scope of the claims and it will be understood by those skilled in the art that the modifications and changes are also included in the technical range of the present disclosure. Furthermore, the components in the above-described embodiments may be arbitrarily combined without departing from the scope and spirit of the present disclosure.

The radio communication apparatus 1 according to the first embodiment, the radio communication apparatus 1A according to the second embodiment, and the radio communication apparatus 1B according to the third embodiment are included in the STA 20, but may be included in the PCP 50. In this case, the allocation of a calibration period can be easily performed. Since the PCP 50 performs network management, a request for calibration period reservation is not rejected.

When a request for calibration period reservation is rejected in a case where the radio communication apparatus 1 according to the first embodiment, the radio communication apparatus 1A according to the second embodiment, and the radio communication apparatus 1B according to the third embodiment are included in the STA 20, the STA 20 may restructure a network instead of the PCP 50. When roles in a network are exchanged between the PCP 50 and the STA 20, the reservation of a calibration period can be easily performed.

By way of example, the radio communication apparatus 1 according to the first embodiment, the radio communication apparatus 1A according to the second embodiment, and the radio communication apparatus 1B according to the third embodiment are made up of pieces of hardware. However, they may be implemented by software in conjunction with the pieces of hardware.

Each functional block used in the description of the radio communication apparatus 1 according to the first embodiment, the radio communication apparatus 1A according to the second embodiment, and the radio communication apparatus 1B according to the third embodiment is typically constructed as an large-scale integrated (LSI) circuit. These functional blocks may be individual chips, or some of or all of them may be formed into one chip. The term "LSI" is used here, but this may be referred to as "IC", "system LSI", "super LSI", or "ultra LSI" in accordance with the degree of integration.

A circuit integration method is not limited to the large-scale integration (LSI), and may be implemented by a dedicated circuit or a general-purpose processor. After the production of an LSI circuit, a field programmable gate array (FPGA) or a reconfigurable processor that can reconfigure the connection and setting of circuit cells in the LSI circuit may be used.

When a circuit integration technology that takes the place of the LSI is provided as a result of the progress of a semiconductor technology or the use of another derivative technology, the functional blocks may be integrated using this technology. For example, the application of biotechnology can be considered.

Summary of an Aspect of the Present Disclosure

According to a first aspect of the present disclosure, there is provided a radio communication method including the steps of: storing a beam having a good characteristic and a beam having a bad characteristic on the basis of a result of beamforming setting; reserving a calibration period; changing a beam to the beam having the bad characteristic in the reserved calibration period; performing calibration in the reserved calibration period; and changing the beam having the bad characteristic to the beam having the good characteristic after the reserved calibration period has elapsed.

According to a second aspect of the present disclosure, in the radio communication method of the first aspect, the reserving step is started after a degradation of a transmission characteristic or a reception characteristic has been detected.

According to a third aspect of the present disclosure, the radio communication method of the first aspect further includes the step of releasing the reserved calibration period after the step of changing the beam having the bad characteristic to the beam having a good characteristic.

According to a fourth aspect of the present disclosure, in the radio communication method of the first aspect, it is determined that the transmission characteristic or the reception characteristic has been degraded when a retransmission rate and a throughput degradation rate during a predetermined period reaches a predetermined level.

According to a fifth aspect of the present disclosure, in the radio communication method of the first aspect, it is determined that the transmission characteristic or the reception characteristic has been degraded when a temperature increases from a startup temperature measured by a temperature sensor by predetermined degrees or more or a temperature reaches a temperature limit regardless of the amount of temperature rise from the startup temperature.

According to a sixth aspect of the present disclosure, in the radio communication method of the first aspect, it is determined that the transmission characteristic or the reception characteristic has been degraded when a difference between power that has been received, measured, and notified by a communication partner and transmission power set in advance is larger than or equal to a predetermined value.

According to a seventh aspect of the present disclosure, in the radio communication method of the first aspect, it is determined that the transmission characteristic or the reception characteristic has been degraded when the number of CRC errors continuously exceeds a predetermined value.

According to an eighth aspect of the present disclosure, in the radio communication method of the first aspect, in the reserving step, a period in which a local station has a transmission right is reserved in addition to a data communication period.

According to a ninth aspect of the present disclosure, in the radio communication method of the first aspect, in the reserving step, the data communication period is reserved as the calibration period.

According to a tenth aspect of the present disclosure, in the radio communication method of the first aspect, in the reserving step, when a period reservation request issued by a terminal is rejected, the terminal temporarily serves as a base station and reserves the calibration period.

According to an eleventh aspect of the present disclosure, in the radio communication method of the first aspect, in the reserving step, a time taken to perform calibration is stored and the next reservation of the calibration period is performed on the basis of the stored time.

According to a twelfth aspect of the present disclosure, in the radio communication method of the first aspect, in the reserving step, the calibration period is reserved for a plurality of channels at the same period.

According to a thirteenth aspect of the present disclosure, in the radio communication method of the first aspect, in the reserving step, a reserved period is a Service Period.

According to a fourteenth aspect of the present disclosure, in the radio communication method of the first aspect, in the storing step, a beam facing the beam having the good characteristic is set as the beam having the bad characteristic.

According to a fifteenth aspect of the present disclosure, in the radio communication method of the first aspect, in the storing step, the beam having the bad characteristic is determined on the basis of a beamforming control packet including information about the beam having the bad characteristic.

According to an aspect of the present disclosure, there is provided a radio communication apparatus including: a beamforming result storage that stores a beam having a good characteristic and a beam having a bad characteristic on the basis of a result of beamforming setting; a period reserver that reserves a calibration period; a first beam changer that changes a beam to the beam having the bad characteristic in the reserved calibration period; a calibrator that performs calibration in the reserved calibration period; and a second beam changer that changes the beam having the bad characteristic to the beam having the good characteristic after the reserved calibration period has elapsed.

The present disclosure is useful for a radio communication apparatus having a function of performing calibration for the sake of improving the degradation of a transmission characteristic or a reception characteristic.

What is claimed is:

1. A radio communication method performed by a radio communication apparatus, the radio communication method comprising:
    storing a beam having a good characteristic and a beam having a bad characteristic on the basis of a result of beamforming setting;
    detecting a degradation of at least one of a transmission characteristic and a reception characteristic that occurs because of heat from one or more circuits;
    reserving a calibration period in response to detecting the degradation of the at least one of the transmission characteristic and the reception characteristic that occurs because of heat from one or more circuits;
    changing a beam to the beam having the bad characteristic in the reserved calibration period;
    performing calibration using the beam having the bad characteristic in the reserved calibration period; and
    changing the beam having the bad characteristic to the beam having the good characteristic after the reserved calibration period has elapsed,
    wherein the beam having the bad characteristic is the beam having the worst reception level on the basis of the result of beamforming setting.

2. The radio communication method according to claim 1, wherein the detecting of the degradation of the at least one of the transmission characteristic and the reception characteristic that occurs because of heat from one or more circuits is in response to receiving information from a temperature sensor.

3. The radio communication method according to claim 2, wherein the detecting includes determining that the transmission characteristic or the reception characteristic has been degraded when a retransmission rate and a throughput degradation rate during a predetermined period reaches a predetermined level.

4. The radio communication method according to claim 2, wherein the detecting includes determining that the transmission characteristic or the reception characteristic has been degraded when a temperature increases from a startup temperature measured by the temperature sensor by predetermined degrees or more or a temperature reaches a temperature limit regardless of the amount of temperature rise from the startup temperature.

5. The radio communication method according to claim 2, wherein the detecting includes determining that the transmission characteristic or the reception characteristic has been degraded when a difference between power that has been received, measured, and notified by a communication partner and transmission power set in advance is larger than or equal to a predetermined value.

6. The radio communication method according to claim 2, wherein the detecting includes determining that the transmission characteristic or the reception characteristic has been degraded when the number of Cyclic Redundancy Check (CRC) errors continuously exceeds a predetermined value.

7. The radio communication method according to claim 1, further comprising:
    releasing the reserved calibration period after the changing the beam having the bad characteristic to the beam having the good characteristic.

8. The radio communication method according to claim 1, wherein the reserving includes reserving a period in which a local station has a transmission right in addition to a data communication period.

9. The radio communication method according to claim 1, wherein the reserving includes reserving a data communication period as the calibration period.

10. The radio communication method according to claim 1, wherein, when a period reservation request issued by a terminal is rejected, the terminal temporarily serves as a base station and performs the reserving of the calibration period.

11. The radio communication method according to claim 1, a time taken to perform calibration is stored and the reserving includes reserving a next calibration period on the basis of the stored time.

12. The radio communication method according to claim 1, wherein the reserving includes reserving the calibration period for a plurality of channels at the same period.

13. The radio communication method according to claim 1, wherein the reserving includes reserving the calibration period for a reserved period that is a Service Period.

14. The radio communication method according to claim 1, wherein the storing includes storing a beam facing the beam having the good characteristic as the beam having the bad characteristic.

15. The radio communication method according to claim 1, wherein the storing includes determining the beam having the bad characteristic on the basis of a beamforming control packet including information about the beam having the bad characteristic.

16. The radio communication method according to claim 1, wherein the reserved calibration period is a no-signal period in which the radio communication apparatus does not receive a signal from another radio communication apparatus.

17. A radio communication apparatus comprising:
    beamforming result storing circuitry which, in operation stores a beam having a good characteristic and a beam having a bad characteristic on the basis of a result of beamforming setting;
    detection circuitry which, in operation, detects a degradation of at least one of a transmission characteristic and a reception characteristic that occurs because of heat from one or more circuits;
    period reserving circuitry which, in operation, reserves a calibration period in response to the detection circuitry detecting the degradation of the at least one of the transmission characteristic and the reception characteristic that occurs because of heat from one or more circuits;
    first beam changing circuitry which, in operation, changes a beam to the beam having the bad characteristic in the reserved calibration period;
    calibrating circuitry which, in operation, performs calibration using the beam having the bad characteristic in the reserved calibration period; and
    second beam changing circuitry which, in operation, changes the beam having the bad characteristic to the beam having the good characteristic after the reserved calibration period has elapsed,
    wherein the beam having the bad characteristic is the beam having the worst reception level on the basis of the result of beamforming setting.

18. The radio communication apparatus according to claim 17, wherein the detection circuitry, in operation, detects the degradation of the at least one of the transmission characteristic and the reception characteristic that occurs because of heat from one or more circuits in response to receiving information from a temperature sensor.

19. The radio communication apparatus according to claim 18, wherein the detection circuitry, in operation, determines that the transmission characteristic or the reception characteristic has been degraded when a retransmission rate and a throughput degradation rate during a predetermined period reaches a predetermined level.

20. The radio communication apparatus according to claim 18, wherein the detection circuitry, in operation, determines that the transmission characteristic or the reception characteristic has been degraded when a temperature increases from a startup temperature measured by the temperature sensor by predetermined degrees or more or a temperature reaches a temperature limit regardless of the amount of temperature rise from the startup temperature.

21. The radio communication apparatus according to claim 17, wherein the reserving circuitry, in operation, releases the reserved calibration period after the second changing circuitry changes the beam having the bad characteristic to the beam having the good characteristic.

22. The radio communication apparatus according to claim 17, wherein the reserved calibration period is a no-signal period in which the radio communication apparatus does not receive a signal from another radio communication apparatus.

* * * * *